(12) United States Patent
Motozawa et al.

(10) Patent No.: US 6,604,771 B2
(45) Date of Patent: Aug. 12, 2003

(54) VEHICLE OCCUPANT PROTECTION APPARATUS

(75) Inventors: Yasuki Motozawa, Saitama (JP); Takahiro Kamei, Saitama (JP); Yasushi Kawamura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 29 days.

(21) Appl. No.: 10/016,318

(22) Filed: Oct. 30, 2001

(65) Prior Publication Data
US 2002/0084131 A1 Jul. 4, 2002

(30) Foreign Application Priority Data
Oct. 31, 2000 (JP) ......................................... 2000-331776

(51) Int. Cl.⁷ ................................................ B60N 2/02
(52) U.S. Cl. .................... 296/68.1; 297/216.1; 280/806
(58) Field of Search ................................ 296/68.1, 188, 296/189; 297/216.1, 216.16, 216.18; 280/777, 806; 102/274

(56) References Cited

U.S. PATENT DOCUMENTS

| | | | | | |
|---|---|---|---|---|---|
| 3,992,046 | A | * | 11/1976 | Braess | ......................... 296/68.1 |
| 5,249,826 | A | * | 10/1993 | Bell | ........................... 280/777 |
| 5,279,227 | A | * | 1/1994 | Nishizawa | .................. 102/274 |
| 5,626,203 | A | * | 5/1997 | Habib | ..................... 297/216.18 |
| 5,746,467 | A | * | 5/1998 | Jesadanont | ................. 296/68.1 |
| 5,873,558 | A | * | 2/1999 | Sakamoto | .............. 297/216.18 |
| 6,050,637 | A | * | 4/2000 | HÅland et al. | ........... 297/216.1 |
| 6,116,561 | A | * | 9/2000 | Christopher | ........... 297/216.16 |
| 6,186,574 | B1 | * | 2/2001 | Motozawa et al. | ......... 296/68.1 |
| 6,193,293 | B1 | | 2/2001 | Ybanez | ....................... 294/152 |
| 6,193,296 | B1 | * | 2/2001 | Motozawa et al. | ......... 296/68.1 |
| 6,254,164 | B1 | * | 7/2001 | Kawamura et al. | ......... 296/68.1 |
| 6,312,038 | B1 | * | 11/2001 | Kawamura et al. | ......... 296/68.1 |
| 6,352,312 | B1 | * | 3/2002 | Rees | ........................ 297/216.1 |
| 6,394,535 | B1 | * | 5/2002 | Kawamura et al. | ......... 296/68.1 |
| 6,398,285 | B2 | * | 6/2002 | Motozawa et al. | ......... 296/68.1 |
| 6,402,218 | B1 | * | 6/2002 | Kamei et al. | ............... 296/68.1 |
| 6,422,632 | B1 | * | 7/2002 | Kamei et al. | ............... 296/68.1 |
| 6,454,351 | B2 | * | 9/2002 | Motozawa et al. | ......... 296/68.1 |
| 2002/0079689 | A1 | * | 6/2002 | Motozawa et al. | .......... 280/806 |
| 2003/0010560 | A1 | * | 1/2003 | Motozawa | ................... 280/806 |
| 2003/0029661 | A1 | * | 2/2003 | Motozawa | .................. 296/68.1 |

FOREIGN PATENT DOCUMENTS

| | | |
|---|---|---|
| JP | 7-101354 | 4/1995 |
| JP | 2000-62556 | 2/2000 |

\* cited by examiner

Primary Examiner—Kiran Patel
(74) Attorney, Agent, or Firm—MacPherson Kwok Chen & Heid LLP (57) ABSTRACT

A lock plate and a movable plate are provided to fix a seat at an optional position, and an actuator is provided between the seat and the movable plate. The seat is moved to the rear of a vehicle body in an initial stage of impact by the actuator. Acceleration is generated in the seat through impact abutment of a collapsible tube in the actuator against a piston head in an intermediate stage of impact. In a final stage of the impact, the seat is made integral with the vehicle body. The deceleration of a vehicle body and a seat and the deceleration of an occupant can be made equal to each other at an earlier timing. The apparatus can be installed by making use of a space under the seat, whereby the necessity of securing a special vacant space for installation of the apparatus can be obviated.

11 Claims, 7 Drawing Sheets

VEHICLE OCCUPANT PROTECTION APPARATUS

BACKGROUND OF THE INVENTION

The present invention relates to a vehicle occupant-protecting apparatus, and more particularly to a vehicle occupant-protecting apparatus for reducing deceleration applied to a vehicle occupant at the time of a vehicle collision.

In recent years, various types of vehicle structures that can reduce the deceleration of portions of a vehicle body other than a passenger compartment have been proposed. For example, such reduction has been achieved by appropriately setting deformation moods in collision for the portions of the vehicle body other than the passenger compartment, and by preventing the deformation of the vehicle body in collision from extending to the passenger compartment to improve the vehicle occupant-protecting effect. Refer a Japanese Patent Unexamined Publication No. Hei. 7-101354.

On the other hand, the deceleration of the occupant restrained in the seat by the seat belt rises when an inertia force is borne by the seat belt. Note that this inertia force is exerted on an occupant restrained in the seat by the seat belt in a forward direction in the vehicle collision. Since the spring effect of the seat belt cannot entirely be eliminated, the occupant moves by virtue of the inertia force and the deceleration of the occupant reaches its peak when the maximum extension of the seat belt is reached. The more the occupant is moved by inertia force, the higher the peak value of the occupant deceleration is increased. Accordingly, in general the value exceeds the mean deceleration of the passenger compartment of the vehicle body. Consequently, in order to reduce the impact borne by the occupant, the vehicle body deceleration needs to be adjusted such that the delay in time of the rise of the occupant deceleration relative to the vehicle body deceleration becomes as small as possible.

However, it is substantially not possible to integrally connect the occupant with the vehicle body. In particular, in the case of small cars in which the deformation stroke of the portions of the vehicle body other than the passenger compartment cannot sufficiently be provided, it is difficult to reduce further the occupant deceleration only with the conventional method for reducing the deceleration of the passenger compartment at the time of collision by setting deformation stress for the vehicle body.

The inventors of the invention disclosed herein proposed a vehicle occupant-protecting apparatus, as shown in the specification of Japanese Patent Unexamined Publication No. 2000-062556 (corresponding to U.S. Pat. No. 6,193,293). The apparatus has a seat supported on a vehicle body to be movable along a direction in which a force is applied to the vehicle body when a vehicle collides. The apparatus also has a first acceleration mechanism for applying acceleration to the seat in the same direction as that in which impact load is applied to the vehicle body and a second acceleration mechanism for applying acceleration to the seat in an opposite direction to the direction in which the impact load is applied to the vehicle body.

In the vehicle occupant-protecting apparatus so proposed, however, occupant-protecting apparatus driving rails are provided separately from seat rails for adjusting longitudinally the position of the seat. Furthermore, the first and second acceleration mechanisms are mounted on the vehicle body as constituent mechanism components independent from the seat. Consequently, the occupant-protecting apparatus itself becomes relatively larger in size and heavier in weight. Further, due to a complicated construction thereof man-hours for assembling on the production line are increased. This causes disadvantages in mounting space, cost and weight. In particular, this causes a problem that the occupant-protecting apparatus becomes difficult to be mounted on a small car light in weight and inexpensive in price.

SUMMARY OF THE INVENTION

It is an object of the present invention to solve the problems above, and to provide an improved occupant-protecting apparatus that can realize at higher levels a vehicle body compact in dimensions, light in weight and low in price while attaining the reduction of the vehicle occupant deceleration.

The object can be attained by a vehicle occupant-protecting apparatus according to a first aspect of the invention.

The apparatus comprises:
a lower rail fixed to a vehicle body;
an upper rail slidably supported on the lower rail,
a seat integrated with the upper rail and provided with a seat belt for restraining an occupant seated in the seat;
a seat slide lock mechanism for allowing the seat to be selected between a position changeable state and a fixed state,
a first acceleration member comprising a cylinder integrated with the seat for applying acceleration to the seat in the same direction as that in which impact load is applied to the vehicle body, a piston connected to the seat slide lock mechanism and piston pushing member for generating force to push out the piston from the cylinder in collision, and a second acceleration member provided inside the cylinder such that acceleration is applied to the seat via the piston in an opposite direction to the direction in which impact load is applied to the vehicle body.

According to this construction, in case of a head-on collision, for example, a higher deceleration than the vehicle deceleration can be generated in the seat in an earlier stage of impact by accelerating the seat rearward by the first acceleration member the moment a collision occurs to thereby increase the restraining force of the seat belt for restraining the forward movement of the occupant. Following this, the deceleration of the seat can be adjusted by the second acceleration member so as to substantially match the deceleration of the occupant. Thus, the increase in forward inertia force applied to the occupant at the time of collision can be cancelled so that the decelerations of the vehicle body, the seat and the occupant become equal to one another in the early stage of the impact, and since the first and second acceleration member are provided inside the cylinder which is integrated with the seat, the occupant-protecting apparatus can be place by making use of a space, for example, under the seat, this obviating the necessity of securing a particular vacant space only for this apparatus, thereby making it possible to attain the vehicle body compact in dimensions while promoting the reduction in weight and price.

In addition, according to a second aspect of the invention, there is provided a vehicle occupant-protecting apparatus as set forth in the first aspect of the invention, wherein a selective lock member is provided between the piston and the cylinder, the selective lock member being adapted to be in an engaged state when the seat is moved to adjust its sliding position and to be put in a released state with the pushing force generated by the piston pushing member when the piston pushing member pushes out the piston. According to this construction, the sliding adjustment of the seat becomes possible in normal use.

Additionally, according to a third aspect of the invention, there is provided a vehicle occupant-protecting apparatus as set forth in the second aspect of the invention, wherein a unidirectional piston movement restriction member is provided between the piston and the cylinder, the unidirectional piston movement restriction member being adapted to be left free relative to a direction in which the piston is pushed out but to prevent the movement of the piston in an opposite direction to that in which the piston is pushed out. According to this construction, when the piston moves and the seat attempts to return forward after it has moved rearward, the vehicle body and the seat can be made integral with each other by member of the first acceleration member and the second acceleration member, thus the decelerations of the occupant and the vehicle body in the final stage of the impact being made to substantially match each other.

The above-mentioned object can also be attained by a vehicle occupant-protecting apparatus, according to the present invention comprising:
  a seat for supporting at least one occupant;
  lower rails fixed to a body of the vehicle;
  upper rails connected to the seat of the vehicle and slidably supported on the lower rails;
  an acceleration device integrated with the seat, the acceleration device including:
    a cylinder;
    a piston at least partially disposed within the cylinder;
    a first acceleration member disposed within the cylinder and operable to apply a force to the piston to accelerate the seat in a same direction as that in which an impact load is applied to the vehicle body; and
    a second acceleration member disposed within the cylinder and operable to apply a force to the piston to accelerate the seat in an opposite direction to the direction as that in which the impact load is applied to the vehicle body; and
  a seat slide lock device connected to the acceleration device and operable to allow the at least one occupant to adjust and fix a sliding position of the seat.

The above-mentioned vehicle occupant-protecting apparatus, according to the present invention, may further include:
  a selective lock member, the selective lock member operable to prevent piston movement when the seat is moved by the at least one occupant to adjust and fix the sliding position of the seat, and to be put in a released state allowing piston movement in response to the first acceleration member applying force to the piston.

The vehicle occupant-protecting apparatus according to the present invention, may further includes:
  a unidirectional piston movement restriction member operable to allow piston movement in response to the first acceleration member applying force to the piston and to prevent movement of the piston in a direction opposite to the piston movement.

The vehicle occupant-protecting apparatus according to the present invention, may further includes:
  a seat belt operable to restrict movement of the at least one occupant.

In the vehicle occupant-protecting apparatus according to the present invention, combustion of a propellant may be used by the first acceleration member to apply the force to the piston.

In addition, in the vehicle occupant-protecting apparatus according to the present invention, the seat slide lock device may include:
  a lock plate secured to each of the lower rails, the lock plate having a plurality of lock holes;
  a moveable plate attached to and bridging the lock plates, the moveable plate having moveable pawls biased towards and operable to be engaged with the plurality of lock holes; and
  a frame connecting the moveable plate to the acceleration device.

Further, in the vehicle occupant-protecting apparatus according to the present invention, the second acceleration member may include a cylindrical collapsible tube.

Moreover, the vehicle occupant-protecting apparatus according to the present invention may include a collision detector operable to detect the application of the impact load to the vehicle body and provide a communication to the acceleration member.

The above-mentioned object can be achieved by a vehicle occupant protection apparatus according to the present invention comprising:
  a seat supported on a vehicle body so as to be slidable in a direction in which an impact load is applied to the vehicle body as a result of a collision of the vehicle;
  a first actuator operable to apply an acceleration to the seat relative to the vehicle body in a same direction as the impact load immediately after the vehicle collision, the first actuator including:
    a cylinder connected to the seat;
    a piston movable within the cylinder and connected to the vehicle body; and
    a generator for generating a piston pushing force to push-out the piston from the cylinder during the vehicle collision; and
  a second actuator disposed inside of the cylinder of the first actuator and operable to apply an acceleration to the seat in an opposite direction from the impact load.

In the vehicle occupant protection apparatus according to the present invention, the second actuator may comprise a cylindrical collapsible tube.

In addition, the vehicle occupant protection apparatus according to the present invention, the piston and the cylinder of the first actuator may be actuated by combustion of a propellant.

The vehicle occupant protection apparatus according to the present invention may include:
  a selective lock member provided between the piston and the cylinder, the selective lock member being adapted to be in an engaged state when the seat is moved to adjust its sliding position and to be put in a released state in response to actuation of the first actuator.

The vehicle occupant protection apparatus according to the present invention may further include:
  a unidirectional piston movement restriction member provided between the piston and the cylinder, the unidirectional piston movement restriction member being adapted to allow free movement of the piston relative to a direction in which the piston is pushed-out, and to prevent movement of the piston in an opposite direction to that in which the piston is pushed-out.

The vehicle occupant protection apparatus according to the present invention may further include:
  a collision detector operable to detect the application of the impact load to the vehicle body and provide a communication to the first actuator.

The vehicle occupant protection apparatus according to the present invention may further include:

a seat slide lock device connected to the first actuator and operable to allow at least one occupant of the vehicle to adjust and fix the sliding position of the seat.

The vehicle occupant protection apparatus according to the present invention may further include:

a seat belt operable to restrict movement of at least one occupant of the vehicle.

DETAILED DESCRIPTION OF THE PREFERRED EMBODIMENTS

An embodiment of the invention will be described in detail based on a specific examples illustrated in the drawings.

Figure 1:
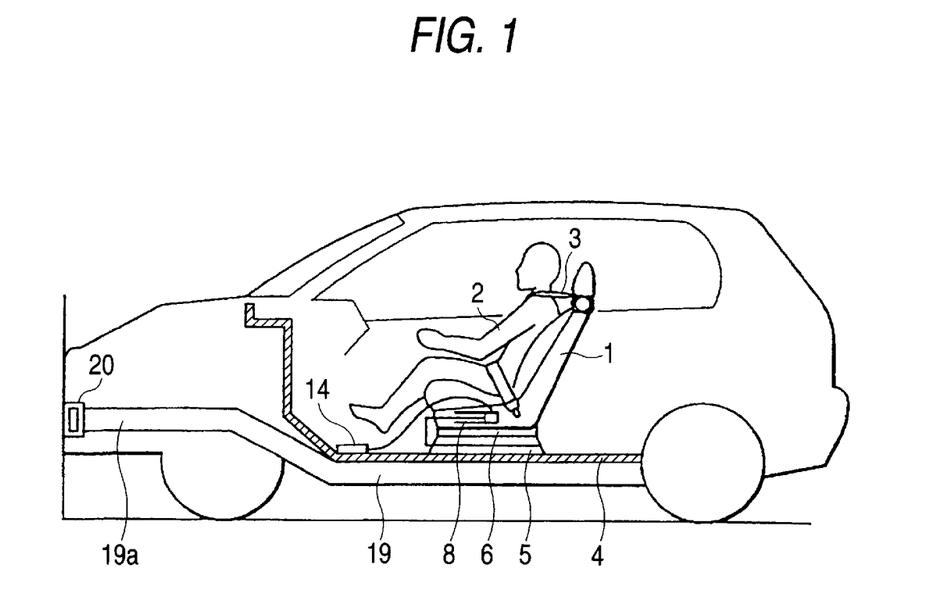
FIG. 1 is a typical side view schematically showing the constitution of a vehicle to which a vehicle occupant-protecting apparatus according to the invention is applied.

FIG. 1 shows schematically the constitution of a vehicle to which a vehicle occupant-protecting apparatus according to the invention is applied. A seat belt 3 is connected to a seat 1 for restraining the movement of an occupant 2 relative to the seat 1. The seat 1 is allowed to move within a predetermined range along a vehicle traveling direction relative to a floor 4 which constitutes a passenger compartment of a vehicle body.

Figure 2:
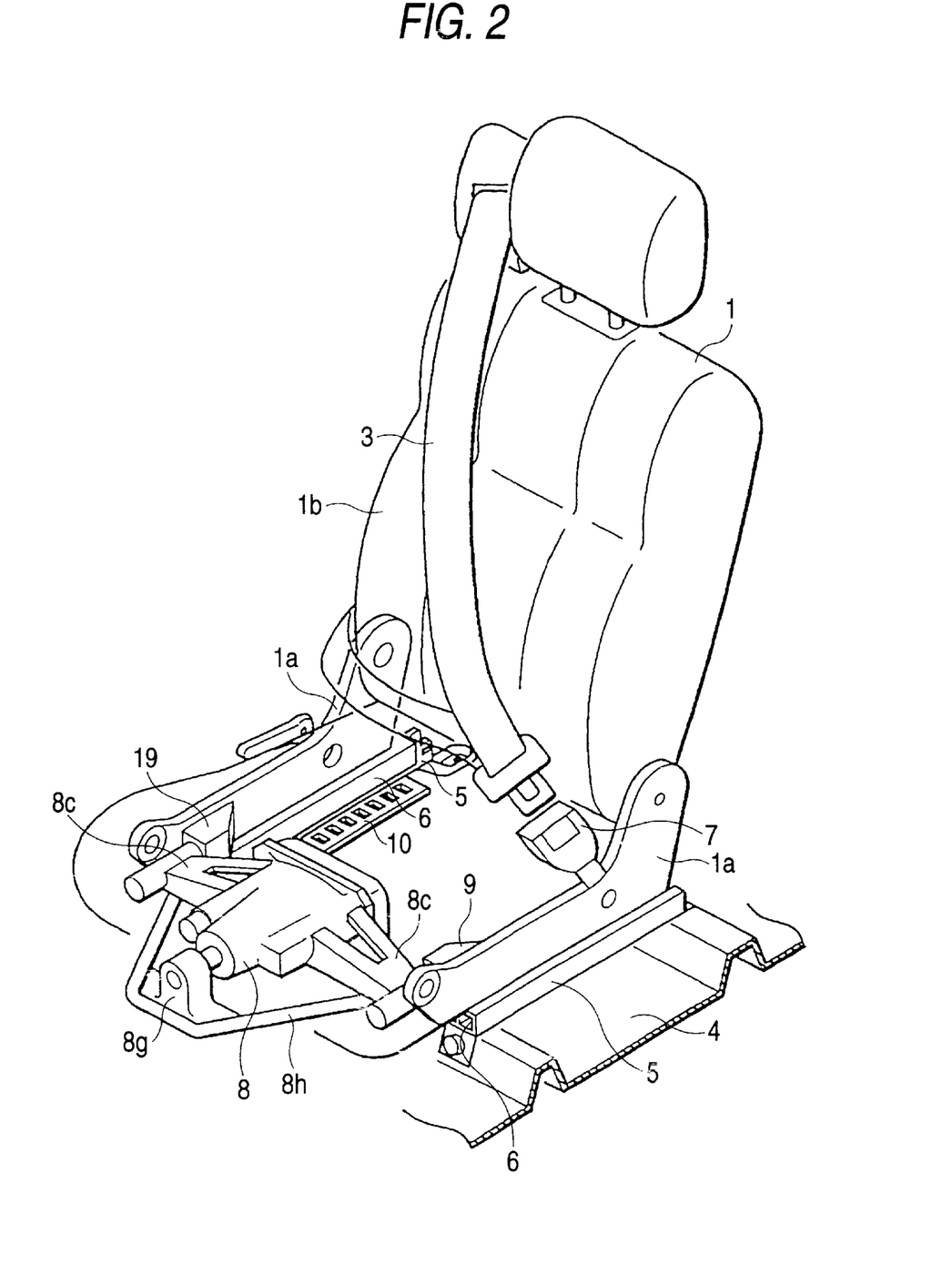
FIG. 2 is a perspective view of a seat of the vehicle occupant-protecting apparatus according to the invention, as viewed from above.
Figure 3:
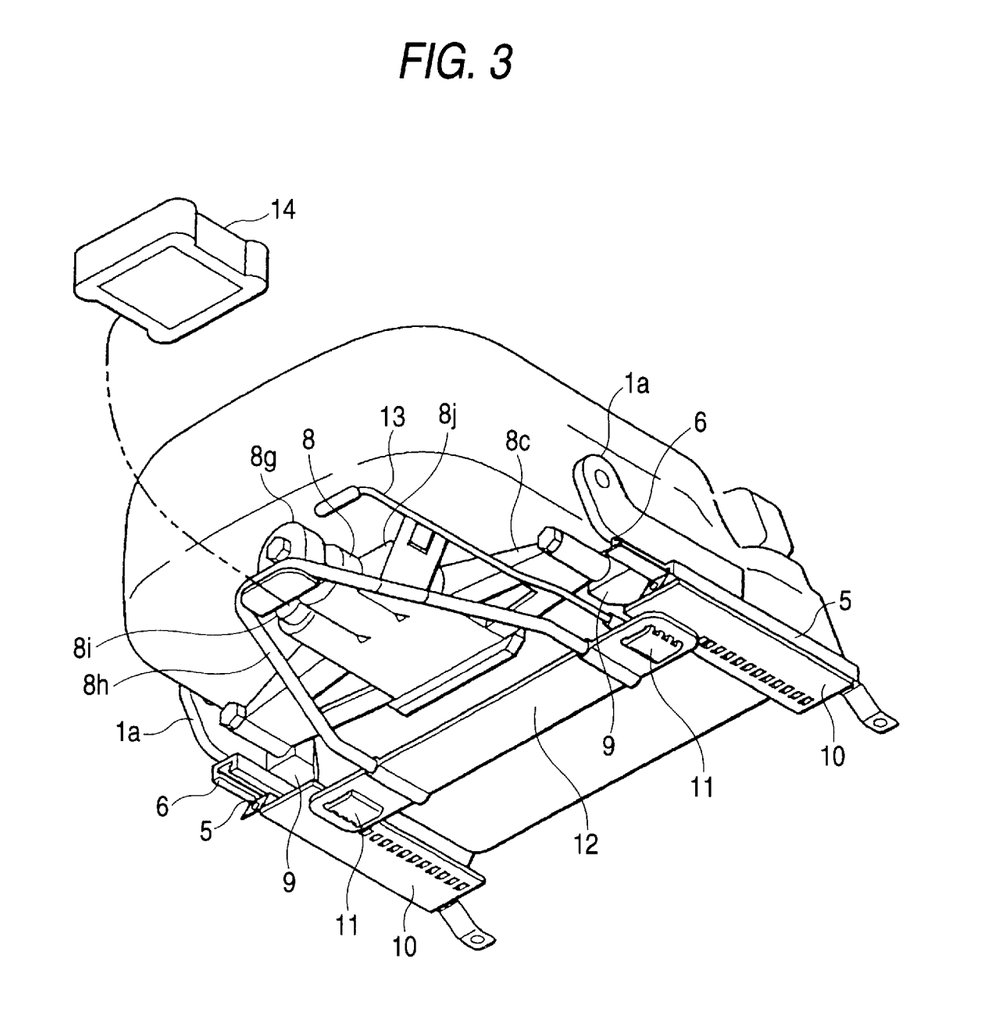
FIG. 3 is a perspective view of a seat of the vehicle occupant-protecting apparatus according to the invention, as viewed from below.

As shown in FIGS. 2 and 3, a pair of left and right lower rails 5 are fixedly provided on the floor 4, and upper rails 6 are provided slidably on the lower rails 5, respectively. The upper rails 6 and the seat are integrated with each other, and the seat 1 is provided movably relative to the floor 4. In addition, one end of the seat belt 3 is connected to a shoulder portion of the seat 1, and an intermediate portion of the three point seat belt is connected to a seat-integrated anchor portion 7. Therefore, an occupant seated in the seat 1 is integrally restrained in the seat 1 with the seat belt 3.

Provided under the seat 1 is an actuator 8 constituting a first acceleration member and a second acceleration member. As shown in both FIGS. 4A, 4B, the actuator 8 has a housing 8a and a piston head 8b accommodated in the housing 8a. Arm-like housing brackets 8c are connected with bolts to sides of the housing 8a at one ends thereof. The respective housing brackets 8c are fastened with screws, respectively, to brackets 9, for example, welded to insides of seat side brackets 1a. Thus, the actuator 8 is integrally assembled to the seat 1. In addition, reclining brackets are integrally mounted on the seat side bracket 1a, whereby both the brackets rotatably support a seat back 1b, and hence a reclining angle adjusting member is provided.

The floor 4 is fixedly placed on a main frame 19 provided in such a manner as to extend in a longitudinal direction of the vehicle body. A transversely extending bumper beam 20 is fixedly secured to a front end of the vehicle body corresponding to an engine room portion 19a of the main frame 19. Note that the engine room portion 19a of the main frame 19 is constructed to be compression deformed so as to absorb impact force generated during impact.

Figure 4A:
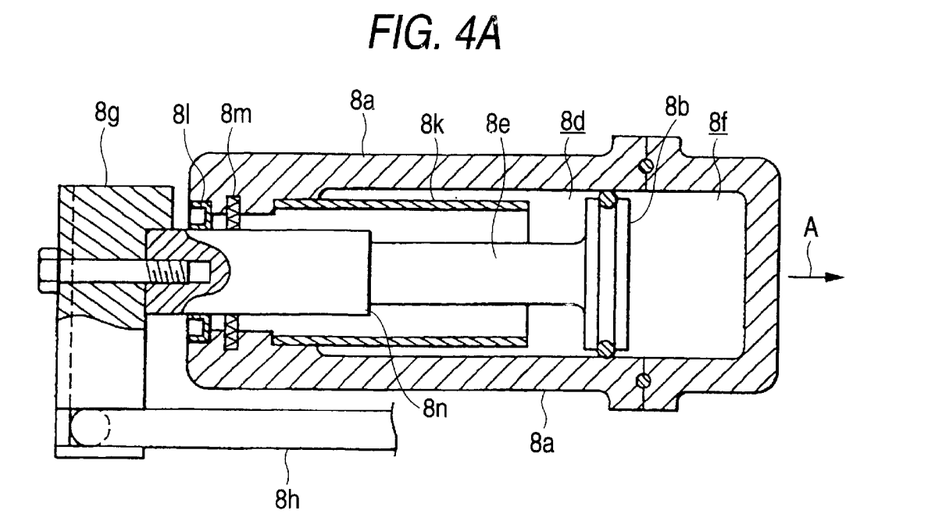
FIG. 4A is a longitudinally vertical cross-sectional view showing an actuator of the vehicle occupant-protecting apparatus according to the invention.

Next, referring to FIGS. 4A, 4B, the construction of the actuator 8 will be described. A cylindrical cylinder room 8d with its axis oriented in longitudinal directions is formed inside the housing 8a of the actuator, and the piston head 8b is accommodated within the cylinder chamber 8d in such a manner as to move in axial directions. On a side of the housing 8a facing the rear of the vehicle a gas expansion chamber 8f is formed between a bottomed cylindrical cylinder head secured to the housing 8a so as to close an opening therein and the piston head 8b.

A piston rod 8e is integrally formed on the piston head 8b on an opposite side thereof to the gas expansion chamber 8f (front of the vehicle) in such a manner as to protrude coaxially. A connecting block 8g is screwed to an end of the projection. A bent portion (an intermediate portion) of a tension rod 8h that is bent substantially into a V shape is brought into engagement with a support groove formed in the connecting block 8g to thereby be supported therein. Note that a piston seal is provided on an outer circumferential portion of the piston head 8 in such a manner to be brought into sliding contact with in inner circumferential surface of the cylinder chamber 8d in order to enhance the airtightness.

In addition as shown in FIG. 3, a lock plate 10 having a plurality lock holes disposed in a row is secured to each lower rail 5. A movable plate 12 is provided in such a manner as to be bridged between the two lock plates 10. The movable plate 12 has at ends thereof movable pawls adapted to be brought into the lock holes of the lock plate 10, respectively. In addition, the movable plate 12 is provided slidably relative to both the lower rails 5. The ends of the tension rod 8h, supported at the intermediate portion thereof by the connecting block 8g, extend toward the rear of the vehicle so as to reach near the pair of left and right lower rails 5 and eventually connects to the movable plate 12.

In addition, the movable pawl 1 is biased in a spring-like fashion in a direction in which the pawl is brought into engagement with the lock hole in the lock plate 10 by member of a spring device, not shown. The seat is held at one of its sliding positions through the engagement between the pawls and the engagement holes. In normal use, in order to move the seat to an optional position, the movable pawls 11 are released from the engagement holes, respectively, against the spring biasing force with a lock release lever 13 and this frees the movable plate 12 relative to the lock plates 10, whereby the seat 1 can be moved.

Figure 4B:
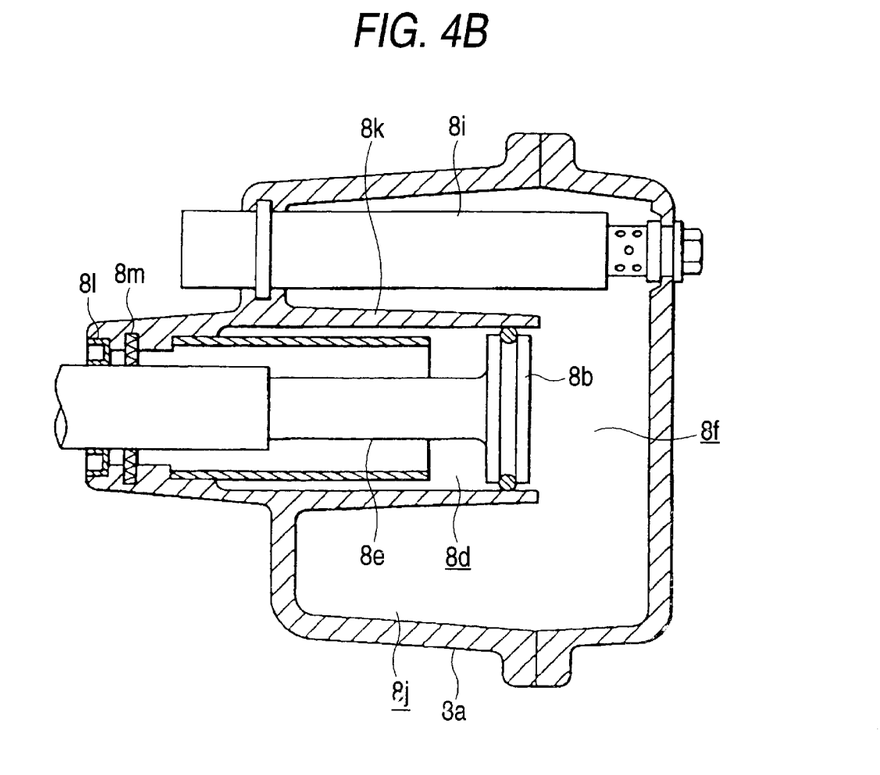
FIG. 4B is a longitudinally horizontal cross-sectional view of the actuator.

In the actuator 8, as shown in FIG. 4B, a gas generator 8i is disposed on one of the sides of the housing 8a which hold therebetween the cylinder chamber 8d, and on the other a pressure tank 8j is disposed, both the gas generator and the pressure tank being allowed to communicate with the gas expansion chamber 8f. The gas generator 8i incorporates therein an impact sensor for detecting a drastic deceleration at the time of impact and is electrically connected to a control device 14 mounted on the floor 4 at an optional position thereon. Note that the pressure tank 8j is provided for regulating the pressure of expansion gas to a predetermined value.

In addition, a cylindrical collapsible tube 8k formed of, for example, a thin-wall steel tube is provided in the cylinder chamber 8d. This cylindrical collapsible tube 8k is disposed in such a manner as to surround concentrically the piston rod 8e and to face directly the piston head 8b at an axial end and be connected to the housing 8a at the other axial end thereof. Moreover, a stopper ring 81 is press fitted on the piston rod 8e at an end thereof which protrudes from the housing 8a as a selective lock member tight fitted on the piston rod 8e.

Furthermore, in the embodiment illustrated in the figure, a smaller diameter portion is formed on the piston head 8b side of the piston rod and a larger diameter portion is formed on the protruding side thereof so as to act as a unidirectional piston movement restriction member, and a radially inwardly oriented one-way lock spring 8m is provided in the housing 8a at a position corresponding to an intermediate portion of the larger diameter portion of the piston rod 8e in such a manner as to be brought into an outer circumference of the larger diameter portion of the piston rod 8e in a spring-like fashion. This one-way lock spring 8m is adapted to be brought into abutment with an outer circumference of the smaller diameter portion of the piston rod 8e in a spring-like fashion when it moves in the protruding direction of the piston rod 8e and passes through a difference in diameter or stepped portion 8n and to be brought into engagement with the stepped portion 8n as the piston rod 8e thereafter moves in a withdrawing direction, thereby checking the movement of the piston rod 8e in the opposite direction (in the withdrawing direction of the piston rod 8e).

Figure 5A:
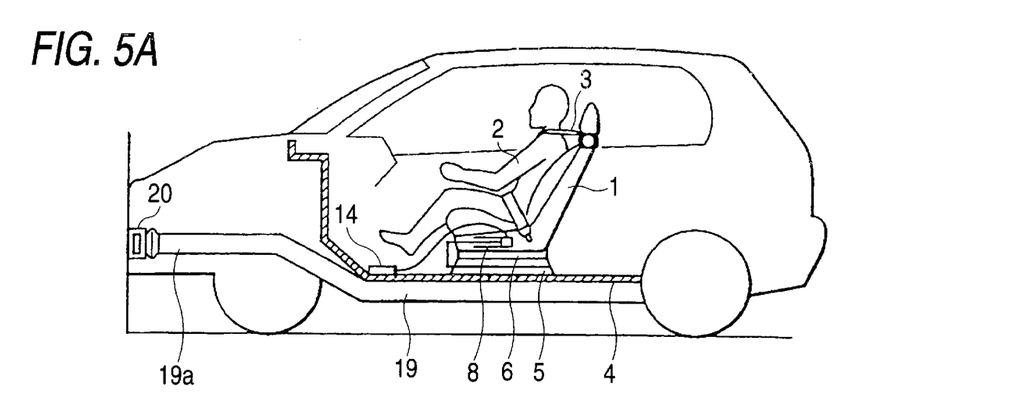
FIG. 5A is a typical side view of a vehicle showing a state immediately after impact (first stage)

An operation process according to the invention of the apparatus constructed as described above will be described below with reference to FIGS. 5 and 6.

First, immediately after an impact (in a first stage), the passenger compartment (the seat 1) receives a load generated in the main frame 19 due to the impact and starts to decelerate. In this first stage, the compression deformation of the engine room portion 19a of the main frame 19 is small, and the deceleration of the seat 1 increases drastically as shown in a portion a in FIG. 7. Then, the drastic deceleration of the passenger compartment (the seat 1) is detected by the aforesaid impact sensor within the control device 14, and a gas generation signal (an ignition current) is sent to the gas generator 8i from the control device 14.

In the gas generator 8i, when the gas generation signal is inputted, a gas generation source is ignited to explode gas. Gas so generated by the explosion then flows into the gas expansion chamber 8f to generate a pressure inside the gas expansion chamber 8, the piston head 8b being thereby pushed. This pushing force acts in a direction in which the piston rod 8e protrudes from the housing 8a, but since the piston rod 8e is integrated with the lock plates 10, the housing 8a moves in a direction indicated by an arrow A shown in FIG. 6A relative to the piston rod 8e. Namely, the seat 1 moves to the rear of the vehicle relative to the floor 4. Thus, the first acceleration member is constituted.

In addition, as described previously, the piston rod 8e and the housing 8a are connected to each other via the stopper ring 81. Therefore, the connecting force (press fitting force of the stopper ring 81 into the housing 8a) can move the movable plate 12 integrally with the seat 1 when the seat 1 moves, but the connecting force is adjusted such that the piston rod 8e and the housing 8a are released from each other when exposed to the pushing force of the piston rod 8b generated by the explosion of gas.

Figure 5B:
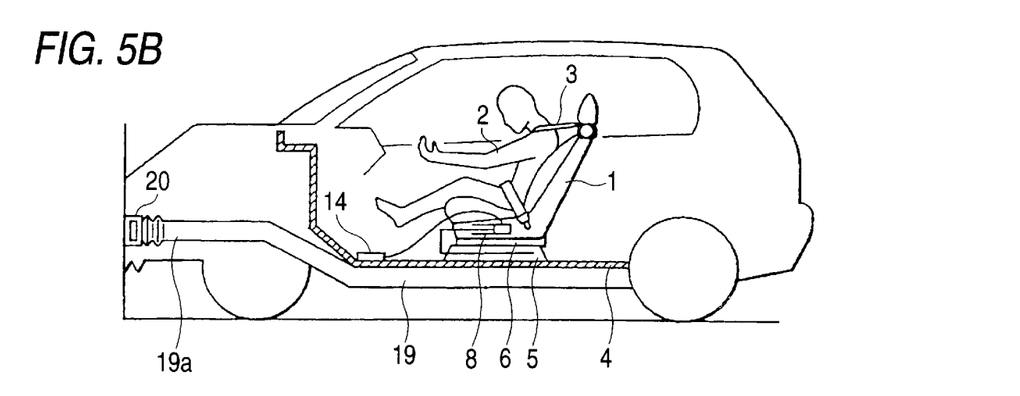
FIG. 5B is a typical side view of the vehicle showing an intermediate state of impact (second stage) and FIG. 5C is a typical side view of the vehicle showing a final state of impact (third stage)
Figure 6A:
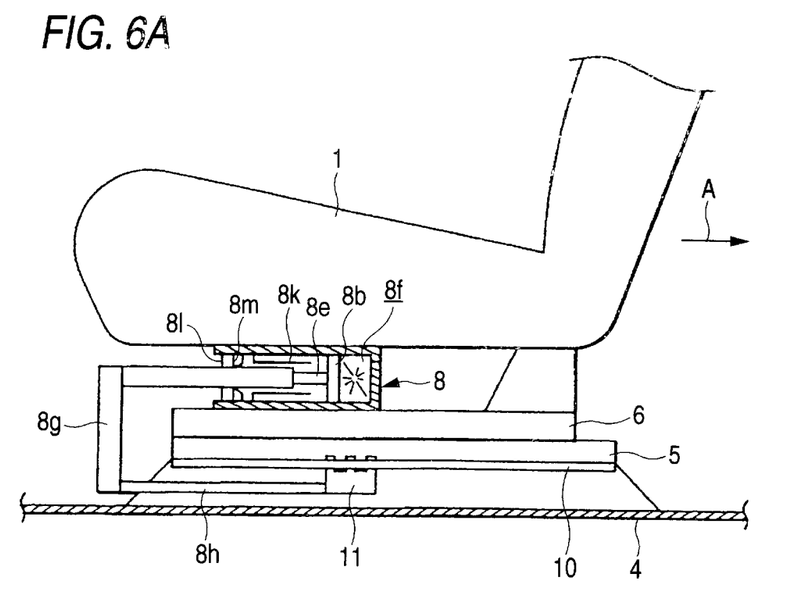
FIG. 6A is a cut-away enlarged side view of a main part of a seat portion corresponding to FIG. 5A.
Figure 6B:
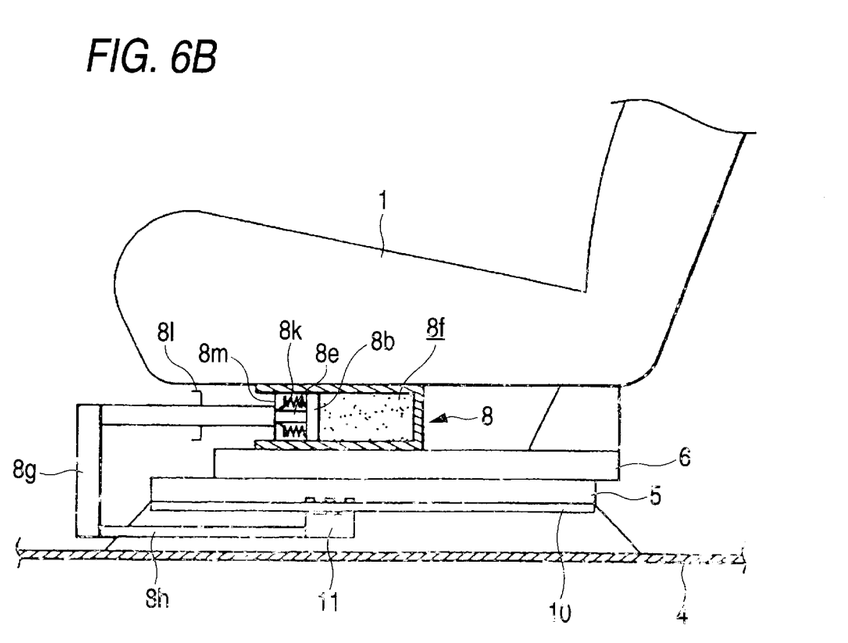
FIG. 6B is a cut-away enlarged side view of the main part corresponding to FIG. 5B.

Next, in a second stage illustrated in FIG. 5B, the piston head 8e is brought into impact abutment with the collapsible tube 8k, but gas explosion force has been generated, and the seat 1 moves to the rear of the vehicle at a relative speed relative to the passenger compartment (floor 4), whereby the collapsible tube 8k is collapsed and deformed by the relative movement of the piston head 8b and the housing 8a (refer to FIG. 6B). A load generated as this occurs is directed to the opposite direction to that in the first stage, and an acceleration is generated in the seat 1 in an opposite direction to the impact deceleration in association with the expansion of compression deformation of the engine room portion 19a of the main frame 19. Thus, the second acceleration member is constituted.

Figure 7:
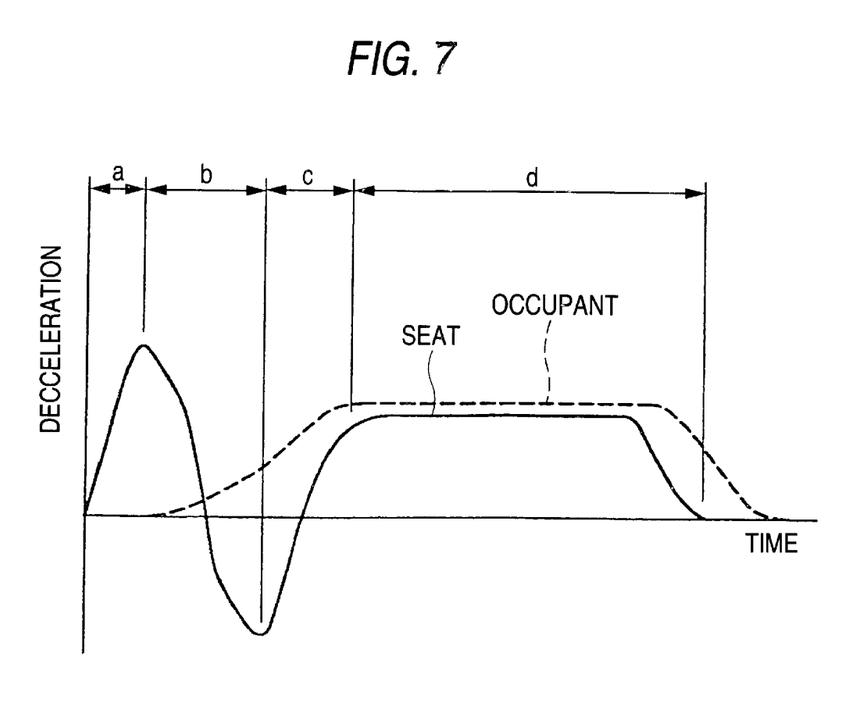
FIG. 7 is a waveform of deceleration at the time of impact.

The acceleration of the seat 1 relative to the floor 4 generated by the second acceleration member serves to reduce the deceleration of the seat 1 as shown at a portion b in FIG. 7, and even an acceleration is developed in the seat. Then, as the acceleration so developed lowers, the deceleration of the seat 1 returns to a certain level of deceleration shown at a portion c in FIG. 7. The physical properties of the material and the configuration of the collapsible tube 8k is adjusted such that a predetermined load is generated to thereby cause the aforesaid change in deceleration occurs to develop. The properties of the seat belt 3, load characteristics of the collapsible tube 8k and gap between the collapsible tube 8k and the piston head 8b are appropriately designed depending on vehicles on which the apparatus is equipped such that the speed and deceleration of the occupant come to match the speed and deceleration of the vehicle body at the point in time where the return of deceleration occurs.

Figure 5C:
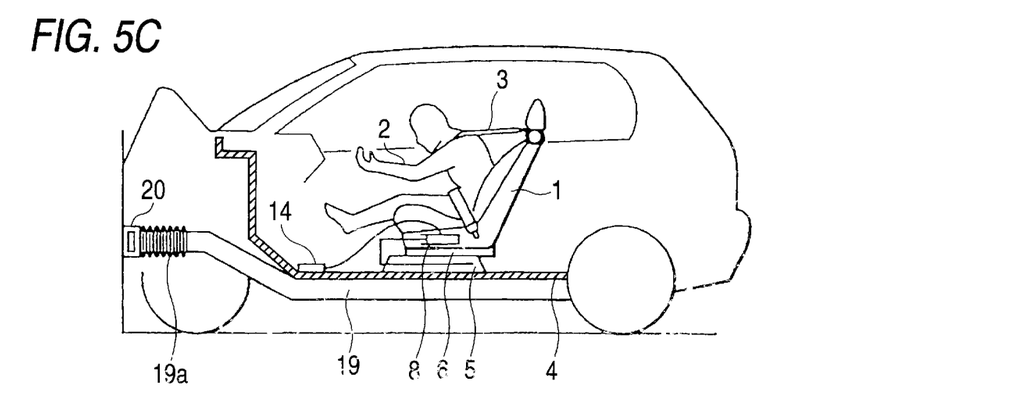

The rearward movement of the seat 1 relative to the floor 4 stops in a third stage shown in FIG. 5C and when the seat 1 attempts to move forward relative to the floor 4, the piston rod 8e is fixed again to the housing 8a by the one-way lock spring 8m against the movement in that direction. Due to this, the passenger compartment (the floor 4) and the seat 1 do not move relative to each other, and the passenger compartment and the seat 1 can continue to be decelerated together until the impact is completed. As this occurs, it is desirable that the vehicle body construction including the compression deformation of the engine room portion 19a of the main frame 19 is appropriately designed such that load generated by the vehicle body (deceleration) continues to be constant until the impact is completed.

Since the speed and deceleration of the occupant substantially coincide with the speed and deceleration of the vehicle body in the third stage, the occupant continues to be decelerated together with the seat 1 and the vehicle body with no relative movement between the seat and the vehicle body being generated. Namely, the occupant is free from being pressed against the seat 1 and is put in a ride down state in which the occupant remains separated apart a certain distance from the seat 1. Since this ride down effect can be fully utilized, the deceleration of the occupant can be maintained sufficiently low.

The invention has a function to create an optimum deceleration waveform shown in FIG. 7 by controlling deceleration generated in the seat belt integrated seat 1 at the time of impact to largely reduce the occupant deceleration through the aforesaid processes. Thus, since the deceleration which is larger than the mean deceleration is generated when a large magnitude of impact reaction force is applied only to a part of the vehicle body in the early stage of the impact, and since the overall vehicle body is eventually decelerated at the average deceleration as a single body, the vehicle body deceleration waveform preferable to reduction in occupant deceleration can be realized, whereby a large reduction in the occupant deceleration can be attained even with a smaller vehicle body deformation (dynamic stroke) than the conventional example. Furthermore, since the movement of the occupant in the passenger compartment (the movement relative to the vehicle body) can be suppressed to a lower level than when attempting to reduce the occupant deceleration using the load limiter on the seat belt, the occupant-protecting apparatus according to the invention can be advantageous in that the possibility of a secondary impact can be reduced.

Thus, according to the invention, in the case of, for example, head-on impact, the seat is accelerated rearward by the first acceleration member momentarily an impact occurs so that a higher deceleration than the vehicle body deceleration is generated in the seat to thereby enhance the restraining force of the seat belt which restrict the forward movement of the occupant, and following this, the deceleration of the seat can be adjusted by the second acceleration member such that the deceleration of the seat substantially matches the deceleration of the occupant, whereby the increase in inertia force which is applied to the occupant in the forward direction at the time of impact can be cancelled, thereby making it possible to make the deceleration of the vehicle body and seat and the deceleration of the occupant equal to each other. Moreover, since the first acceleration member and the second acceleration member are provided in the cylinder which is integrated with the seat, the apparatus of the invention can be installed using a space formed under the seat and this can obviates the necessity of provision of vacant space particularly for installation of the apparatus, thereby attaining the vehicle body which is compact in dimensions, as well as promoting the reduction in weight and price.

In addition, the seat can slidably be adjusted in normal use by providing the selective lock member between the piston and the cylinder, whereby the aforesaid effectiveness can be attained without deteriorating the function of the seat originally inherent therein. Alternatively, the vehicle body and the seat can be made integral with each other when the seat attempts to return forward after the piston is moved by the first acceleration member and the second acceleration member and hence the seat moves rearward relative to the vehicle body by providing the unidirectional piston movement restriction member between the piston and the cylinder it moves rearward relative to the vehicle body, thus the deceleration of the occupant and the deceleration of the vehicle body in the last stage of the impact being caused to substantially coincide with each other with the simple construction as described heretofore.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A vehicle occupant-protecting apparatus comprising:
   a seat for supporting at least one occupant;
   lower rails fixed to a body of the vehicle;
   upper rails connected to the seat of the vehicle and slidably supported on the lower rails;
   an acceleration device integrated with the seat, the acceleration device including:
      a cylinder;
      a piston at least partially disposed within the cylinder;
      a first acceleration member disposed within the cylinder and operable to apply a force to the piston to accelerate the seat in a same direction as that in which an impact load is applied to the vehicle body; and
      a second acceleration member disposed within the cylinder and operable to apply a force to the piston to accelerate the seat in an opposite direction to the direction as that in which the impact load is applied to the vehicle body; and
   a seat slide lock device connected to the acceleration device and operable to allow the at least one occupant to adjust and fix a sliding position of the seat.

2. The vehicle occupant-protecting apparatus according to claim 1, further including:
   a selective lock member, the selective lock member operable to prevent piston movement when the seat is moved by the at least one occupant to adjust and fix the sliding position of the seat, and to be put in a released state allowing piston movement in response to the first acceleration member applying force to the piston.

3. The vehicle occupant-protecting apparatus according to claim 2, further including a unidirectional piston movement restriction member operable to allow piston movement in response to the first acceleration member applying force to the piston and to prevent movement of the piston in a direction opposite to the piston movement.

4. The vehicle occupant-protecting apparatus according to claim 1, further including a seat belt operable to restrict movement of the at least one occupant.

5. The vehicle occupant-protecting apparatus according to claim 1, wherein combustion of a propellant is used by the first acceleration member to apply the force to the piston.

6. The vehicle occupant-protecting apparatus according to claim 1, wherein the seat slide lock device includes:
   a lock plate secured to each of the lower rails, the lock plate having a plurality of lock holes;
   a moveable plate attached to and bridging the lock plates, the moveable plate having moveable pawls biased towards and operable to be engaged with the plurality of lock holes; and
   a frame connecting the moveable plate to the acceleration device.

7. The vehicle occupant-protecting apparatus according to claim 1, wherein the second acceleration member includes a cylindrical collapsible tube.

8. The vehicle occupant-protecting apparatus according to claim 1, further including:
   a collision detector operable to detect the application of the impact load to the vehicle body and provide a communication to the acceleration device.

9. A vehicle occupant-protecting apparatus comprising:
   a seat for supporting at least one occupant;
   lower rails fixed to a body of the vehicle;
   upper rails connected to said seat and slidably supported on said lower rails;

a seat slide lock mechanism operable to allow said seat to be selected between a position changeable state and a fixed state;

first acceleration member comprising a cylinder integrated with said seat for applying acceleration to said seat in the same direction as that in which impact load is applied to the vehicle body, a piston connected to said seat slide lock mechanism and piston pushing member for generating force to push-out said piston from said cylinder during the vehicle collision; and second acceleration member provided within said cylinder such that acceleration is applied to said seat via said piston in an opposite direction to said direction in which impact load is applied to the vehicle body.

10. The vehicle occupant-protecting apparatus according to claim 9, further comprising:

a selective lock member disposed between said piston and said cylinder, said selective lock member being operable to prevent piston movement when the seat is moved by the occupant to adjust and fix the sliding position and to be put in a released state with said pushing force generated by said piston pushing member when said piston pushing member pushes-out said piston.

11. The vehicle occupant-protecting apparatus according to claim 10, further comprising:

a unidirectional piston movement restriction member provided between said piston and said cylinder, said unidirectional piston movement restriction member being operable to allow piston movement in response to the first acceleration member applying force to the piston and to prevent movement of the piston in a direction opposite to the piston movement.

* * * * *